Dec. 18, 1934.   J. E. CROCKETT   1,985,152
PIPE LIFTER AND ALIGNER
Filed April 24, 1934   2 Sheets-Sheet 1
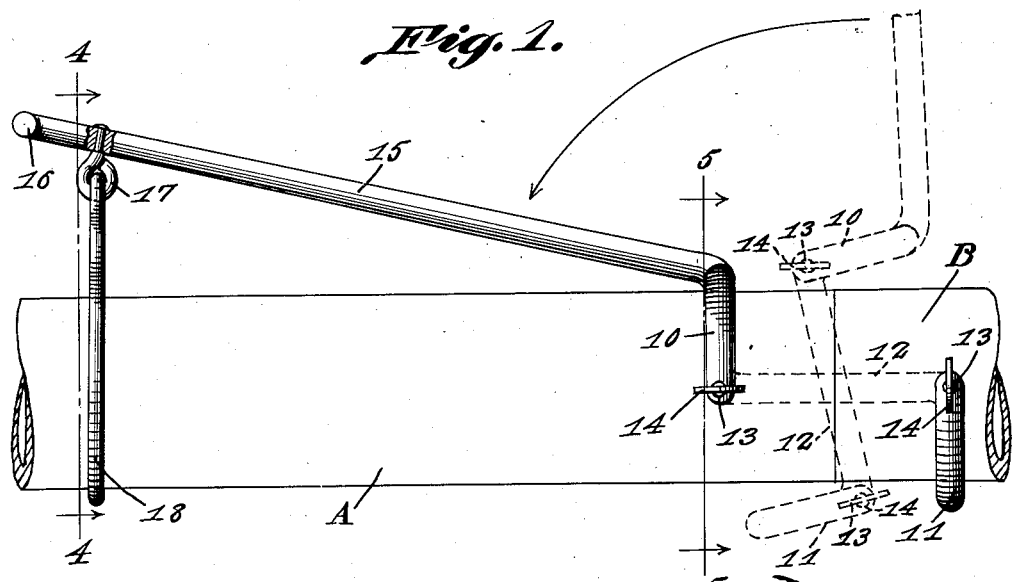
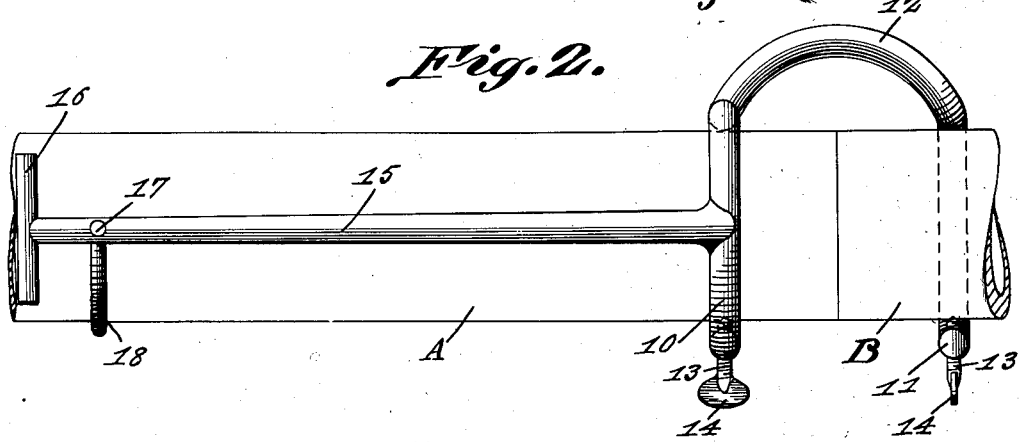
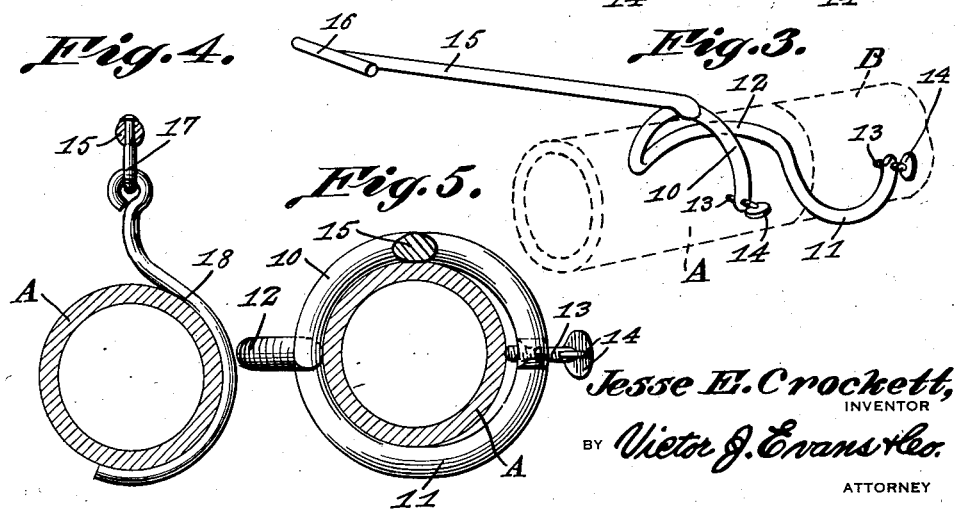
Jesse E. Crockett,
INVENTOR
BY Victor J. Evans & Co.
ATTORNEY Dec. 18, 1934.　　J. E. CROCKETT　　1,985,152
PIPE LIFTER AND ALIGNER
Filed April 24, 1934　　2 Sheets-Sheet 2
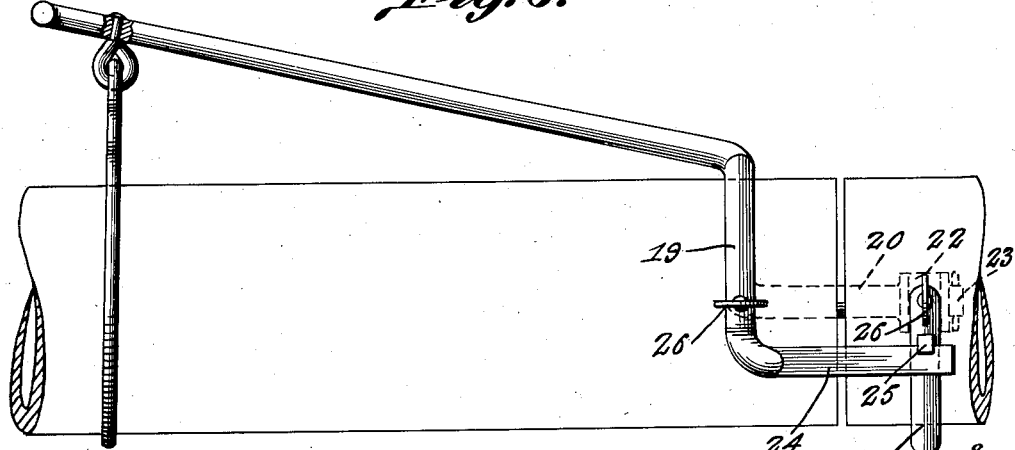
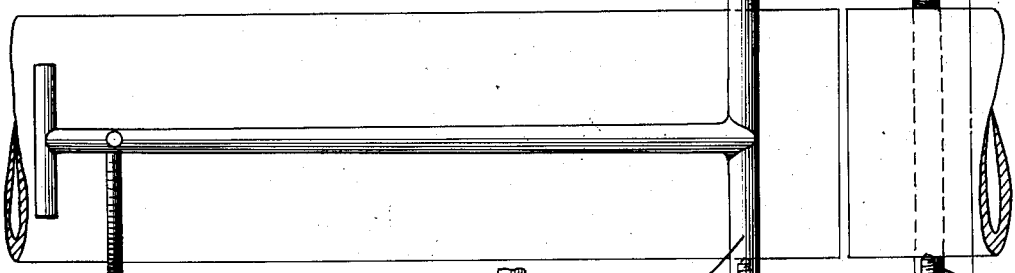
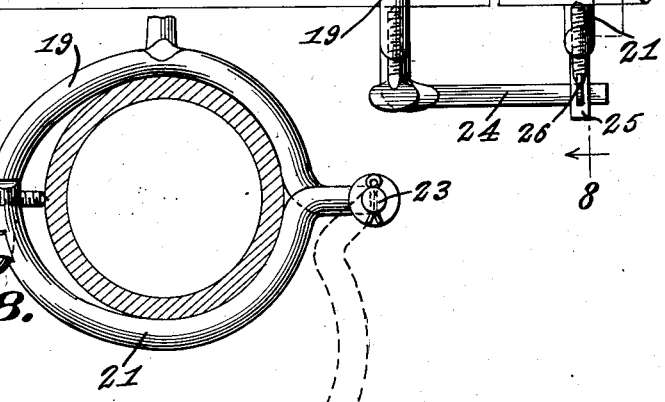
Jesse E. Crockett, INVENTOR
BY Victor J. Evans & Co.
ATTORNEY Patented Dec. 18, 1934

1,985,152

UNITED STATES PATENT OFFICE 1,985,152

PIPE LIFTER AND ALIGNER

Jesse E. Crockett, Minden, La.

Application April 24, 1934, Serial No. 722,202

7 Claims. (Cl. 254—131)

The invention relates to a pipe handling tool or device and more especially to a pipe lifter and aligner.

The primary object of the invention is the provision of a tool or device of this character, wherein the ends adjacent each other of pipe sections can be brought into true alignment with each other, so that such ends can be conveniently connected, and the tool or device will sustain such alignment for the connection of the ends without interference in the making of such connection.

Another object of the invention is the provision of a tool or device of this character, wherein the ends of pipe sections can be supported, aligned and held in such alignment, so that the sections of the pipe may be connected together with dispatch and without the inconvenience of disalignment and avoiding the necessity of manually holding such pipe sections for this purpose.

A further object of the invention is the provision of a tool or device of this character, wherein the same can be readily engaged with and disengaged from the pipe sections with which it is to be employed and is so arranged and constructed as to permit manipulation in supporting and shifting the ends of the pipe sections connected to a pipe line, so that the connections can be conveniently made and true alignment had through the pipe line, the tool or device being of novel construction and requiring minimum exertion on the part of the user for the purposes specified.

A still further object of the invention is the provision of a tool or device of this character, wherein the same can be used on various sizes of pipe sections and may be applied and removed with dispatch, the tool or device being simple in construction, readily and easily operated, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary side elevation of pipe ends showing the tool or device constructed in accordance with the invention applied thereto, the said tool or device being shown by full lines in position for the alignment of the pipe ends and by dotted lines the initial applied position.

Figure 2 is a top plan view.

Figure 3 is a perspective view of the tool showing the pipe ends by dotted lines in the position shown in Figures 1 and 2.

Figure 4 is a sectional view on the line 4—4 of Figure 1 looking in the direction of the arrows.

Figure 5 is a sectional view on the line 5—5 of Figure 1 looking in the direction of the arrows.

Figure 6 is a view similar to Figure 1 showing a modified form of tool or device.

Figure 7 is a top plan view.

Figure 8 is a sectional view on the line 8—8 of Figure 7.

Similar reference characters indicate corresponding parts throughout the several views in the drawings.

Referring to the drawings in detail, particularly Figures 1 to 5 inclusive, A and B designate generally portions of adjacent pipe sections and these are operated upon for the alignment of said sections by the tool or device constituting the present invention and hereinafter fully described.

The tool or device comprises a pair of reversely arched upper and lower saddles 10 and 11, respectively, these being joined at one side in the required spaced relation to each other through an outwardly bowed connecting portion 12, so that the saddles will be in longitudinal alignment with each other and the saddle 10 disposed in bridging relation to one pipe section A and the other saddle 11 underlying and straddling the other pipe section B. These saddles 10 and 11 have fitted therein adjustable retention or binding screws 13, each formed with a winged head 14 and said screws being adapted to retain the pipe sections within the saddles 10 and 11, as will be clearly apparent.

Formed medially of the saddle 10 is a lever 15 having at its free end a cross handle 16, while inwardly with respect to this handle and loosely connected by the eye 17 with the lever is a latching hook 18 adapted to engage with the pipe section, for example, the section A, so as to hold this section aligned with the section B and their ends next to each other in contacting relation or abutment. The lever 15, to bring the pipe sections A and B into alignment, is swung from the position shown by dotted lines in Figure 1 after sidewise engagement of the saddles 10 and 11 over and under the pipe sections to the full line position shown in said figure of the drawings, the saddle 10 being fulcrumed on the pipe section A under movement of the lever and thereafter the hook 18 is latched with the pipe section A and thus the tool or device will sustain the adjacent ends of the pipe sections A and B in alignment with each other, whereby these ends can be coupled or connected in a convenient manner and with dipatch. The connecting portion 12 between the saddles 10 and 11 allows for the locating of the ends next to each other of the pipe sections between the said saddles 10 and 11, as is illustrated in Figures 1 and 2 of the drawings.

It should be apparent that by reason of the size and the formation of the saddles 10 and 11, these will accommodate pipes of different cross-sectional sizes and the said pipe sections will be retained in the saddles by the screws 13. The lever 15 is manually swung by the cross handle end 16.

In Figures 6 to 8 inclusive of the drawings there is shown a slight modification of tool or device, wherein the saddle 19 has, through the connecting extension 20, the saddle 21, swingingly supported. This saddle 21 is formed with the pintle eye 22 at one end, the same being journaled upon the journal end 23 of the extension 20, thus it being seen that the said saddle 21 can be swung with relation to the saddle 19. These saddles 19 and 21 are spaced from each other.

The saddle 19 also has formed therewith a latching extension 24 cooperating with a keeper lug 25 on the saddle 21 at the other end of the latter. On the application of the tool or device to the pipe sections, the swinging saddle 21 will have the keeper lug 25 engaged over the latching extension 24 and in this fashion the said saddle 21 will be maintained against movement.

Both saddles 19 and 21 have fitted therein adjustable retaining or binding screws 26, these being alike to the screws 13 for engaging the pipe sections to retain the same within the saddles.

It will be apparent that by reason of the swinging arrangement of the saddles 21 the tool or device can be more readily applied to the pipe sections with dispatch and this modified form of tool is operated alike to the previously described tool or device for the lifting and aligning of one pipe section with respect to the other.

What is claimed is:

1. A tool of the kind described comprising a pair of reversely arched saddles connected in spaced relation to each other, and a lever on one of the saddles for the rocking of said saddles when engaged over and under adjacent pipe sections to bring the pipe section ends aligned with each other.

2. A tool of the kind described comprising a pair of reversely arched saddles connected in spaced relation to each other, and a lever on one of the saddles for the rocking of said saddles when engaged over and under adjacent pipe sections to bring the pipe section ends aligned with each other, one of the saddles being swingingly supported with respect to the other saddle.

3. A tool of the kind described comprising a pair of reversely arched saddles connected in spaced relation to each other, a lever on one of the saddles for the rocking of said saddles when engaged over and under adjacent pipe sections to bring the pipe section ends aligned with each other, and retaining screws fitted in said saddles.

4. A tool of the kind described comprising a pair of reversely arched saddles connected in spaced relation to each other, a lever on one of the saddles for the rocking of said saddles when engaged over and under adjacent pipe sections to bring the pipe section ends aligned with each other, retaining screws fitted in said saddles, and a latching hook on said lever for engaging with a pipe section for sustaining the pipe section ends when aligned with each other on the operation of said tool.

5. A tool of the kind described comprising a pair of reversely arched saddles connected in spaced relation to each other, a lever on one of the saddles for the rocking of said saddles when engaged over and under adjacent pipe sections to bring the pipe section ends aligned with each other, one of the saddles being swingingly supported with respect to the other saddle, and means for latching the movable saddle fixed with relation to the other saddle.

6. A tool of the kind described comprising a pair of members reversely engaged over and under adjacent pipe sections and connected in spaced relation to each other, and a lever on one of the members for the rocking of said members when engaged over and under the adjacent pipe sections to bring their ends next to each other into alignment one with the other.

7. A tool of the kind described comprising reversely arranged spaced seating members for engagement over and under adjacent pipe sections to align the ends of said pipe sections with each other, and means for imparting movement to said members for the alignment of the pipe section ends one with the other.

JESSE E. CROCKETT.